(12) United States Patent
Mönninghoff et al.

(10) Patent No.: US 7,037,023 B2
(45) Date of Patent: May 2, 2006

(54) BALL JOINT

(75) Inventors: Andreas Mönninghoff, Mettingen (DE); Martin Wellerding, Damme (DE); Martin Rechtien, Neuenkirchen-Vörden (DE); Olaf Abels, Belm (DE); Matthias Gercke, Affinghausen (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/149,279

(22) PCT Filed: Sep. 27, 2001

(86) PCT No.: PCT/DE01/03706

§ 371 (c)(1),
(2), (4) Date: Jun. 6, 2002

(87) PCT Pub. No.: WO02/33275

PCT Pub. Date: Apr. 25, 2002

(65) Prior Publication Data

US 2002/0192016 A1 Dec. 19, 2002

(30) Foreign Application Priority Data

Oct. 19, 2000 (DE) .................. 100 52 122

(51) Int. Cl.
*F16C 11/00* (2006.01)
(52) U.S. Cl. ............... 403/122; 403/135; 403/123; 403/128; 403/131; 403/133; 403/134
(58) Field of Classification Search ............... 403/56, 403/76, 77, 90, 114, 115, 122–144
See application file for complete search history.

(56) References Cited

U.S. PATENT DOCUMENTS

| 2,749,161 | A | * | 6/1956 | Latzen | 403/138 |
| 3,004,786 | A | * | 10/1961 | Herbenar | 403/140 |
| 3,243,212 | A | * | 3/1966 | May | 403/38 |
| 3,379,464 | A | * | 4/1968 | Bradshaw | |
| 3,524,664 | A | * | 8/1970 | Scheublein | 403/140 |
| 4,564,307 | A | | 1/1986 | Ito | |
| 4,858,962 | A | * | 8/1989 | Bolling et al. | 403/131 |
| 5,230,580 | A | * | 7/1993 | Henkel | 403/135 |
| 5,816,731 | A | * | 10/1998 | Howard | 403/132 |
| 5,851,082 | A | | 12/1998 | Schmudde et al. | |

(Continued)

FOREIGN PATENT DOCUMENTS

DE  1 952 620  12/1966

(Continued)

*Primary Examiner*—Daniel P. Stodola
*Assistant Examiner*—Victor MacArthur
(74) *Attorney, Agent, or Firm*—McGlew and Tuttle, P.C.

(57) ABSTRACT

A ball-and-socket joint, especially a wheel guide joint for motor vehicles is provided with a housing (1), in the cavity (2) of which, which is open on at least one side, a bearing shell (3) is inserted with a joint ball (4) mounted therein. The bearing shell (3) forms a assembly unit (3,4) together with the joint ball (4) accommodated therein. The assembly unit is displaceable in the cavity (2) along a axis (6). A first collar (7) and a second collar (8), between which a limited free path (5) of the displaceable assembly unit (3, 4) is defined, form end stops in the cavity (2) of the housing (1). The bearing shell (3) is a accomodated in the cavity (2) under a slight radial pretension and at least one compensating element (15) is arranged between the bearing shell (3) and the inner surface of the cavity (2).

30 Claims, 1 Drawing Sheet

U.S. PATENT DOCUMENTS

| | | | |
|---|---|---|---|
| 6,010,272 A | 1/2000 | Littman | |
| 6,019,541 A | 2/2000 | Maughan | |
| 6,042,294 A | 3/2000 | Urbach | |
| 6,095,712 A * | 8/2000 | Ridley et al. | 403/23 |
| 6,422,779 B1 * | 7/2002 | Spagnuolo | 403/138 |

FOREIGN PATENT DOCUMENTS

| | | |
|---|---|---|
| DE | 199 38 770 | 4/2001 |
| DE | 199 43 194 | 4/2001 |
| WO | WO 01/40669 | 6/2001 |

* cited by examiner

BALL JOINT

FIELD OF THE INVENTION

The present invention pertains to a ball-and-socket joint especially for a wheel guide joint for motor vehicles with a housing with a cavity which is open on at least one side. A bearing shell is inserted with a joint ball mounted therein. The bearing shell forms an assembly unit together with the joint ball accomodated therein. The assembly unit is displaceable in the cavity along an axis. A first collar and a second collar, between which a limited free path of the displaceable assembly unit defined, form end stops in the cavity of the housing.

BACKGROUND OF THE INVENTION

Such a ball-and-socket joint, as is known, e.g., from U.S. Pat. No. 6,042,294 or U.S. Pat. No. 6,010,272 and can be used as a wheel guide joint for motor vehicles, comprises a housing, which has a cavity that is open on at least one side. A bearing shell with a joint ball mounted therein is inserted into this cavity.

In solutions according to the documents cited, the bearing shell is displaceable together together with the joint ball accommodated by it in the cavity along an axis coinciding with the axis of symmetry of the bearing shell, and a first collar and a second collar, between which a limited free path of the displaceable bearing shall is thus defined, form end stops in the cavity of the housing, so that the assembly unit comprising the bearing shell and the joint ball can be moved slidingly to and fro between the first collar and the second collar of the housing. Slide bearings have a clearance, which is called "bearing slackness," between the bearing surfaces sliding on one another. This bearing slackness is the cause that the combination of a slide bearing with a ball-and-socket joint has been able to be solved only unsatisfactorily so far. The ball-and-socket joint embodiments according to U.S. Pat. No. 6,042,294 or U.S. Pat. No. 6,010,272 also fail to offer a satisfactory solution to this.

Another problem is that especially the ball-and-socket joints in the wheel carrier of a motor vehicle are subject to high thermal loads. These stem from adjacent components, such as the brakes, and have a lasting affect on the mounting characteristics. Even though heat protection shields are sometimes meaningful, they cannot permanently protect the ball-and-socket joints, so that there is a need for joints that have an approximately constant mounting characteristic despite extreme temperature changes. These difficulties in prior-art ball-and-socket joints increase with increasing outside temperature and are additionally intensified by the temperature effects on the components receiving the ball-and-socket joint in the motor vehicle.

SUMMARY OF THE INVENTION

The technical object of the present invention can be considered to be to provide a ball-and-socket joint that effectively compensates shape, position and location tolerances as well as deformations of the components of the ball-and-socket joint which are caused by thermal load or by the action of external forces.

According to the invention, a ball-and-socket joint is provided, especially for a wheel guide joint for motor vehicles with a housing with a cavity which is open on at least one side. A bearing shell is inserted with a joint ball mounted therein. The bearing shell forms an assembly unit together with the joint ball accommodated therein. The assembly unit is displaceable in the cavity along an axis. A first collar and a second collar, between which a limited free path of the displaceable assembly unit is defined, form end stops in the cavity of the housing. The bearing shell is accomodated in the cavity under a slight radial pretension and at least one compensating element is arranged between the bearing shell and the inner surface of the cavity.

A completely new approach is taken in the present invention. It is desirable and also achieved here by the embodiment according to the present invention that the bearing shell can move together with the joint ball mounted by it within the housing. Consequently, there is a sliding connection between the outer surface of the bearing shell and the inner surface of the cavity of the housing, in which the bearing shell is accommodated. This solution, which is known per se, is improved according to the present invention by the bearing shell being accommodated in the cavity of the housing under a slight radial pretension, i.e., by the bearing shell being correspondingly supported at the walls of the cavity. This can be imagined, e.g., such that at least one compensating element is arranged between the outer surface of the bearing shell and the inner surface of the cavity.

The bearing shell may be displaceable together with the joint ball accommodated by it in the cavity along an axis, and the location of the axis does not necessarily have to coincide with the axis of symmetry of the bearing shell. Rather, an inclination of the axis within the joint housing is also within the scope of the present invention.

Both shape and position tolerances of the ball-and-socket joint and deformations of the components of the ball-and-socket joint which are caused by thermal loads or by the action of external forces can be effectively compensated with such a ball-and-socket joint design. Moreover, a ball-and-socket joint was created that is free from clearance in the radial direction.

Thermal stresses and, to a lesser extent, even bending, e.g., the sagging of the wheel carrier as a consequence of lateral forces acting on the wheel carrier, can be compensated. The ball-and-socket joint, designed as a movable bearing, transmits radial forces and thus improves the lateral guiding of the wheel of the motor vehicle, which is of considerable advantage especially at the beginning of travel and during braking.

According to one embodiment of the present invention, the above-mentioned radial pretension can be generated by recessing at least one groove in the outer surface of the bearing shell and inserting a compensating element into each groove.

To generate the radial pretension as uniformly as possible, it is meaningful to provide at least two parallel grooves located at spaced locations from one another with compensating elements inserted in them.

The outer dimensions of the compensating element or the compensating elements should be slightly larger than the inner dimension of the cavity of the housing. For example, a slightly crowned outer dimension of each compensating element is particularly advantageous, and the compensating element should have at least a limited elasticity.

The housing of a ball-and-socket joint according to the present invention can be made open on one side or on both sides. In the case of a housing open on one side, it is possible to use the bottom of the housing as a second collar.

Furthermore, it is considered to be meaningful to provide, on a housing that is open on both sides, a first collar, which comprises, e.g., a part of the housing edge directed toward the inside of the joint, and a second collar, which may be designed as a radial flange area of a closing element.

Any component that is able to protect the sensitive inner parts of the bearing from contaminants or from the penetration of moisture may be used as a closing element. For example, sealing bellows made of rubber materials have been known.

Corresponding to a further suggestion, the closing element inserted into a mount of the housing may be fixed by the deformation of a material bead of the housing edge at the housing, which takes place during the closing of the ball-and-socket joint.

The closing element may have a one-part design, but it may also have a multipart design and comprise, e.g., a closing ring and a cover sealingly connected to same. It is recommended that at least one sealing element be used to improve the sealing between the closing ring and the cover. A round ring made of rubber shall be mentioned here only as an example of such a sealing element.

In further embodiments of the present invention, the joint ball may be connected detachably to a pivot. This offers the possibility of connection to components, which can be manufactured separately, in one ball pivot, which is especially useful if surface protection is necessary on only one of these components and nevertheless offers the possibility of a modular system, which makes it possible to manufacture the ball pivot according to the needs from standardized individual parts.

Moreover, the pivot may also be designed as a component of a wheel carrier of a motor vehicle. Due to this measure, i.e., the direct connection of the joint ball to a pivot made in one piece with the wheel carrier, additional attached parts and consequently mounting operations can be eliminated.

A special exemplary embodiment of the present invention will be explained in greater detail below with reference to the drawings.

A special exemplary embodiment of the present invention will be explained in greater detail below with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
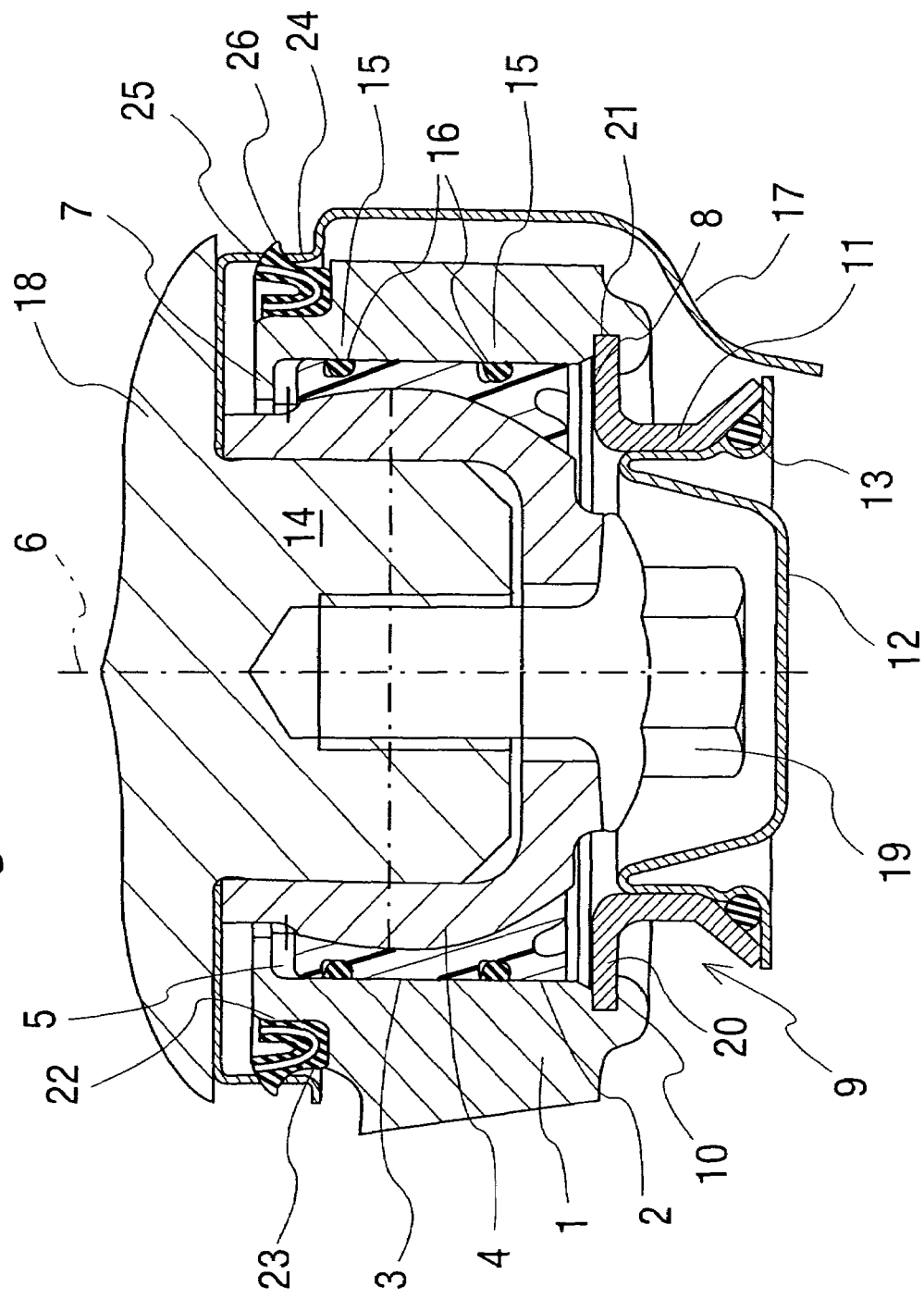
FIG. 1 is a cross sectional view of a detail of a ball-and-socket joint according to the present invention.

Referring to the drawings in particular, in the figure, a joint ball 4 is placed on a pivot 14 of a wheel carrier 18. The joint ball 4 is detachably connected to the pivot 14 by a screw connection 19.

With its spherical geometry having an equator defined as maximum diameter perpendicular to an axis, the joint ball 4 is accomodated in a homogeneous bearing shell 3, which has an inner geometry complementary and conforming to the joint ball 4, above and below its equator. In the example being shown, a cylindrical cavity 2, into which the bearing shell 3 is inserted in a slidingly movable manner, is present in a housing 1 of the ball-and-socket joint, which housing is open on both sides. When viewed in the direction of the axis 6, two circular grooves 16 are recessed at axially spaced locations from one another into the outer surface of the bearing shell. The grooves 16 accomodate a compesating element 15 each. Each compensating element generates, relative to the axis 6, a radial pretension between the bearing shell 3 and the inner surface of the cavity 2. Tolerance compensation is thus achieved and the bearing shell is prevented, furthermore, from performing a rotary movement around the axis 6. The radial rigidity, i.e., the damping properties of this ball-and-socket joint, can be set highly accurately in the radial direction. It can also be determined from the figure that the out circumference of the compensating element 15 is crowned here, and a ring-shaped cross section was therefore selected. This guarantees the absence of radial clearance, on the one hand, and, on the other hand, the easy axial mobility of the assembly unit comprising the joint ball 4 and the bearing shell 3 within the cavity 2.

The housing 1 has, furthermore, a first collar 7 as well as a second collar 8 on the opposite side. The distance between these collars 7 and 8 is selected to be greater than the height of the bearing shell 3. Thus, a free path 5 is left, which makes possible the axial mobility of the assembly unit comprising the bearing shell 3 and the joint ball 4 to freely slide from a bottom position where the bearing shell contacts the second collar to a top position where the bearing shell contacts the top collar.

In the exemplary being shown, a part of the housing edge directed toward the inside of the joint is used as the first collar 7, and a radial flange area 20 of a closing element designated as a whole by 9 is used as the second collar 8. The closing element 9 is of a multipart design in the disclosed embodiment for reasons of mounting. It comprises a closing ring 11 and a cover 12 forming a driving fit with the closing ring 11. For better sealing, a sealing element 13 was inserted between the cover 12 and the closing ring 11.

During the mounting of the ball-and-socket joint, the closing ring 11 is first inserted with a radially directed flange area 20 into a mounting groove 21 arranged on the inside of the housing. Deformation of a material bead 10 of the housing edge subsequently takes place during the closing of the housing, as a result of which the closing ring 11 is fixed.

A heat protection shield 17 protects the components of the ball-and-socket joint in the known manner from the harmful heat radiation of adjacent components. These are the brakes of the motor vehicle at the wheel carrier 18.

To optimize the sealing of the ball-and-socket joint against external effects, an elastic seal 23, whose outer elastic sealing surface 24 is supported against the heat protection shield of the ball-and-socket joint, is inserted into a ring area 22. The seal 23 is arranged on the pivot side, i.e., on the side of the first collar 7 at the joint housing, and the mounting may be performed by using a connection incorporated into the material or by a positive-locking or non-positive connection. To improve the elasticity, the seal 23 was made of a rubber material, which has an insert 25 in this embodiment. The seal has, furthermore, a bead-like section 26.

While a specific embodiment of the invention has been shown and described in detail to illustrate the application of the principles of the invention, it will be understood that the invention may be embodied otherwise without departing from such principles.

What is claimed is:

1. A ball-and-socket wheel guide joint for motor vehicles, the joint comprising:
   a housing with a cavity open on at least one side and on at least another side;
   a joint ball having an equator defined as a maximum diameter perpendicular to an axis;
   a bearing shell inserted into said housing with said joints ball mounted therein, said bearing shell is homogeneous and circles said equator in a conforming contact there between which extends below and above said equator and forms an assembly unit together with said joint ball accommodated therein, said assembly unit being movably mounted in said cavity along said axis;
   a first collar and a second collar defining a limited free path of said movably mounted assembly unit, said first collar and said second collar forming end stops in said cavity of said housing, said bearing shell is free to slide with said joint ball from a bottom position contacting said second collar to a top position contacting said first collar path; and
   a compensating element arranged between said bearing shell and an inner surface of said cavity, said compensating element biasing said bearing shell in said cavity under a slight radial pretension.

2. A ball-and-socket joint in accordance with claim 1, wherein at least one groove is recessed in the outer surface of said bearing shell and said compensating element is inserted into said groove and has an outer dimension that is slightly larger than an inner dimension of said cavity;

3. A ball-and-socket joint in accordance with claim 1, wherein said housing is open on both sides and said first collar is a part of a housing edge directed toward an inside of the joint, and said second collar is radial flange area of a closing element; and
   said second collar is spaced from said joint ball.

4. A ball-and-socket joint in accordance with claim 3, further comprising:
   a mount of said housing, wherein said closing element is inserted into said mount of said housing and is fixed by a deformed material bead after the mounting of the ball-and-socket joint.

5. A ball-and-socket joint in accordance with claim 3, wherein said closing element has a multipart design and comprises a closing ring and a cover sealingly connected to said closing element.

6. A ball-and-socket joint in accordance with claim 5, further comprising a sealing element accomodated between said closing ring and said cover.

7. A ball-and-socket joint in accordance with claim 1, further comprising a pivot, wherein said joint ball is detachably connected to said pivot, said pivot being part of a wheel carrier.

8. A joint in accordance with claim 1, wherein:
   said assembly unit is movable into contact with either said first collar or said second collar by force applied to said joint ball along said axis.

9. A joint in accordance with claim 1, wherein:
   said cavity is a substantially cylindrical cavity;
   said bearing shell has an outer surface which defines a circular groove and another circular groove spaced apart axially;
   said compensating element is arranged in said circular grooves and another compensating element is arranged in said another circular groove, said compensating element and said another compensating element apply a radial force between said bearing shell and an inner surface of said cavity.

10. A ball-and-socket joint comprising:
    a housing with a cavity open on at least one side and on at least another side;
    a joint ball having an equator defined as a maximum diameter perpendicular to an axis;
    a bearing shell inserted into said housing with said joint ball mounted therein, said bearing shell being homogeneous and circling said equator in a conforming contact there between and extending below and above said equator and forming an assembly unit together with said joint ball accomodated therein, said assembly unit being movably mounted in said cavity substantially along said axis;
    a first collar and a second collar defing a limited free path of said bearing shell that freely moves with said joint ball from a bottom position where said bearing shell contacts said first collar to a top position where said bearing shell contacts said top collar, said first collar and said second collar forming end stops in said cavity of said housing; and
    a compensating element arranged between said bearing shell and an inner surface of said cavity, said compensating element applying a slight radial pretension to said bearing shell.

11. A ball-and-socket joint in accordance with claim 10, wherein an outer surface of said bearing shell has a groove and said compensating element is inserted into said groove and has an outer dimension that is slightly larger than an inner dimension of said cavity.

12. A joint in accordance with claim 10, wherein:
    said assembly unit is movable into contact with either said first or second stops by force applied to said joint ball along said axis.

13. A ball-and-socket joint comprising:
    a joint ball;
    a bearing shell arranged around said joint ball, said joint ball and said bearing shell together forming an assembly unit, said bearing shell having an inner geometry substantially complementary to said joint ball;
    a housing defining a cavity with an opening on one side and on another side of said housing, said opening and said cavity having an axial direction, said assembly unit being movably mounted in said cavity in said axial direction, said joint ball having an equator defined as a maximum diameter perpendicular to said axial direction, said bearing shell being homogeneous and circling said equator in a conforming contact there between which extends below and above said equator, said inner geometry of said bearing shell being arranged on diametrically opposite sides of said maximum diameter;
    first and second collars arranged in said cavity, said first and second collars limiting a path of movement of said assembly unit in said axial direction, where said bearing shell is free to move with said joint ball from a bottom position where said bearing shell contacts said second collar to a top position where said bearing shell contacts said top collar; and
    a compensating element arranged between said bearing shell and said housing, said compensating element radially biasing said bearing shell inward.

14. A ball-and-socket joint in accordance with claim 13, further comprising:

a heat protection shield arranged around said housing for shielding against adjacent components.

15. A joint in accordance with claim 14, wherein a wheel carrier is connected to said joint ball, said heat protection shield is connected to said wheel carrier, and an elastic seal is arranged between said shield and said housing, said seal and said shield are arranged to seal said cavity open on at least one side from a surrounding environment.

16. A joint in accordance with claim 15, wherein said housing defines a ring area around said opening of said cavity, said elastic seal is arranged in said ring area and mounted on said housing by using a connection incorporated into the material or by a positive-locking or nonpositive connection, said elastic seal includes an elastic sealing surface arranged against said heat protection sheild, said seal being formed of a rubber material, and said seal including an insert and a bead section.

17. A joint in accordance with claim 13, wherein said whole bearing shell is freely movable into contact with either said first or second collars by force applied to said joint ball in said axial direction.

18. A joint in accordance with claim 17, wherein said cavity is a substantially cylindrical cavity, said bearing shell has an outer surface which defines two circular grooves spaced apart axially, and said compensating element is arranged in one of said grooves and another compensating element is arranged in the other of said grooves, said compensating element and said another compensating element apply a radial force biasing said bearing shell away from an inner surface of said housing.

19. A joint in accordance with claim 13, wherein said compensating element is indirect contact with an outer surface of said bearing shell and a surface of said cavity.

20. A joint in accordance with claim 19, wherein said outer surface of said bearing shell defines a groove, and said compensating element is arranged in said groove.

21. A joint in accordance with claim 20, wherein said bearing shell is formed in one piece.

22. A joint in accordance with claim 13, wherein said bearing shell is formed in one piece.

23. A joint in accordance with claim 13, wherein said inner geometry of said bearing shell is substantially continuous.

24. A joint in accordance with claim 13, wherein said geometry of said bearing shell forms a substantially continuous bearing surface.

25. A joint in accordance with claim 13, wherein said bearing shell is homogeneous.

26. A joint according to claim 13, wherein said bearing shell is freely moveable in two opposite directions between said first and second collars.

27. A joint according to claim 13, wherein said bearing shell is formed in one piece.

28. A joint according to claim 13, wherein a pivot is connected to said joint ball, and a heat-protection shield is arranged between said pivot said joint ball in said axial direction.

29. A joint according to claim 28, wherein said heat protection shield is movable together with said assembly unit in said axial direction relative to said housing.

30. A joint according to claim 28, wherein said joint ball has a first end face, said pivot has a second end face facing said first end face, both end faces being perpendicular to said axial direction, and said heat protection shield is arranged between said first and second end faces and contacts said first and second end faces.

* * * * *